US012413519B1

(12) United States Patent
Azim et al.

(10) Patent No.: US 12,413,519 B1
(45) Date of Patent: Sep. 9, 2025

(54) NETWORK DEVICES PROGRAMMED WITH MOST-USED ROUTES

(71) Applicant: Amazon Technologies, Inc., Seattle, WA (US)

(72) Inventors: Tahir Azim, Artarmon (AU); Benjamin Villain, Zetland (AU); Andrey Sokolov, Glebe (AU); Bobby Brown, Sydney (AU); Lincoln Travis Dale, Santa Clara, CA (US); Stefan Christian Richter, Seattle, WA (US); Apoorv Srivastava, Sydney (AU)

(73) Assignee: Amazon Technologies, Inc., Seattle, WA (US)

( * ) Notice: Subject to any disclaimer, the term of this patent is extended or adjusted under 35 U.S.C. 154(b) by 715 days.

(21) Appl. No.: 17/706,468

(22) Filed: Mar. 28, 2022

(51) Int. Cl.
*H04L 47/12* (2022.01)
*H04L 43/0876* (2022.01)
*H04L 45/745* (2022.01)

(52) U.S. Cl.
CPC .......... *H04L 47/12* (2013.01); *H04L 43/0876* (2013.01); *H04L 45/745* (2013.01)

(58) Field of Classification Search
CPC .... H04L 47/12; H04L 43/0876; H04L 45/745
See application file for complete search history.

(56) References Cited

U.S. PATENT DOCUMENTS 7,158,791 B2 * 1/2007 Karino .................. H04L 45/028
370/219
7,197,549 B1 * 3/2007 Salama ............... H04L 61/5061
710/4
10,608,942 B1 * 3/2020 Shaikh .................... H04L 45/70

OTHER PUBLICATIONS

J. Brenes, A. García-Martínez, M. Bagnulo, A. Lutu and C. Pelsser, "Power Prefixes Prioritization for Smarter BGP Reconvergence," in IEEE/ACM Transactions on Networking, vol. 28, No. 3, pp. 1074-1087, Jun. 2020, doi: 10.1109/TNET.2020.2979665. (Year: 2020).*
P. Chen, W. H. Cho, Z. Duan and X. Yuan, "Traffic-Aware Inter-Domain Routing for Improved Internet Routing Stability," IEEE Globecom 2008—2008 IEEE Global Telecommunications Conference, New Orleans, LA, USA, 2008, pp. 1-6, doi: 10.1109/GLOCOM.2008.ECP.429. (Year: 2008).*

* cited by examiner

*Primary Examiner* — Gary Mui
*Assistant Examiner* — Yewon Kim
(74) *Attorney, Agent, or Firm* — Klarquist Sparkman, LLP

(57) ABSTRACT

A system is disclosed for programming target devices with a filtered (reduced) set of route updates. The system can be divided into a backend system and a frontend system. The backend system analyzes all routes being used and generates a prefix list used for filtering. The frontend system can filter the route updates to target routers and switches to ensure that the number of prefixes installed in a forwarding table of the target routers or switches does not exceed a configured amount. Different frontend systems can coordinate to prevent deviations in the forwarding tables. More specifically, different frontend systems can synchronize with each other to ensure that a union of hot prefixes they propagate always remains under a configured prefix count. The backend system can be responsible for computing and maintaining a sorted list of prefixes, which can be at a per-site or per-service granularity.

17 Claims, 9 Drawing Sheets

NETWORK DEVICES PROGRAMMED WITH MOST-USED ROUTES

BACKGROUND

Network switches play a critical role in large computer networks, such as those found in a data center. Server computers in the network can be divided into racks, and network switches can connect the server computers within a rack to routers in the data center. Data passed by switches is generally divided into a series of packets that can be transmitted between devices. Packets include control information and payload data. The control information includes information used to deliver the payload data. For example, control information can include source and destination network addresses (including prefixes), error detection codes, packet sequencing identification, and the like. Typically, control information is found in packet headers and trailers included within the packet and adjacent to the payload data.

Generally, network switches have two primary planes: a control plane and a data plane. The control plane is a management plane that configures the data plane. The data plane receives packets on input ports and transmits the received packets to output ports based on the configuration. A forwarding table within the data plane controls which next hops receive the packets. Typically, the forwarding table is programmed in accordance with routing strategies, such as equal-cost multi-path routing (ECMP), which is a strategy where next-hop packet forwarding to a destination can occur over multiple best paths. Peer routers transmit new routes to neighbor network switches as part of a shared protocol, such as the Border Gateway Protocol (BGP). The new routes can be updated in the forwarding tables of the receiving network switches.

In order to store all Internet routes into the forwarding table, the switches require a large amount of memory, which is expensive. Greater efficiency is needed for programming of network switches.

DETAILED DESCRIPTION

A system is disclosed for programming target network devices with a filtered (reduced) set of route updates. Routers and switches within a network typically require large memory capacity to store forwarding information for all routes on the Internet. Such memory capacity can be expensive. By reducing a set of route updates based upon the most-used routes, routers and switches can require smaller memories, thereby saving costs. The system can be divided into a backend system and a frontend system. The backend system analyzes all routes being used and generates a prefix list used for filtering. The frontend system can filter the route updates to target routers and switches to ensure that the number of prefixes installed in a forwarding table of the target routers or switches does not exceed a configured amount. Different frontend systems can coordinate to prevent deviations in the forwarding tables. More specifically, different frontend systems can synchronize with each other to ensure that a union of most-used (hot) prefixes propagated always remains under a configured prefix count. The backend system can be responsible for computing and maintaining a sorted list of the prefixes, which can be at a per-site or per-service granularity. A default route can continue to be propagated from upstream peers to the target routers or switches to avoid black-holing traffic in catastrophic failure scenarios. The backend and frontend systems can be geographically distributed with the frontend system being closer to the target routers or switches to increase reliability.

Figure 1:
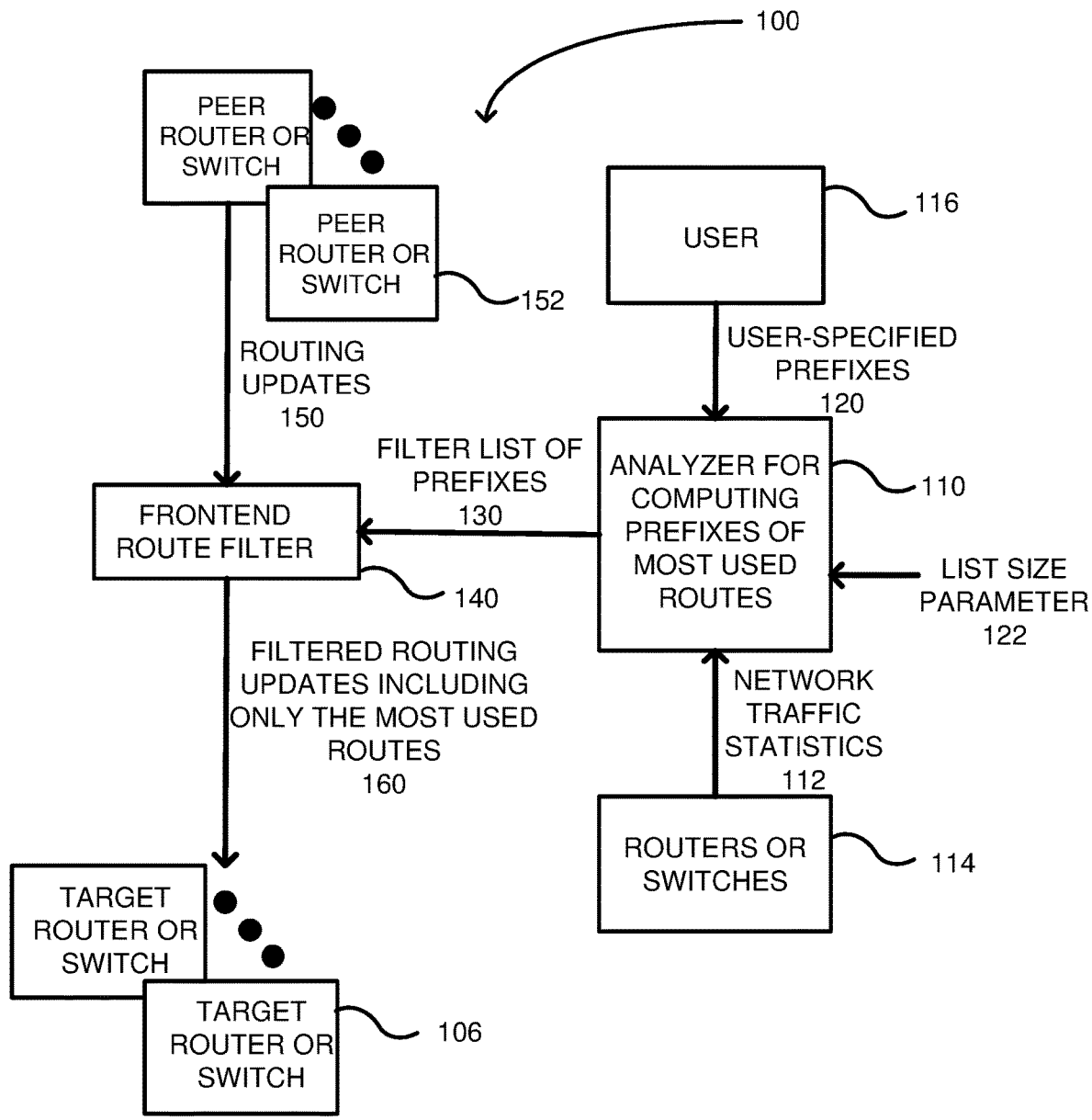
FIG. 1 is an embodiment of a system for programming target routers or switches with a filtered route set.

FIG. 1 is an embodiment of a system 100 for programming target routers or switches 106 with a filtered route set. A backend analyzer 110 receives network traffic statistics 112 from network devices 114, which are illustrated as routers or switches. The traffic statistics 112 can include source and destination addresses, ports used, protocols used, a class of service, etc. The network devices can be from a variety of different manufacturers that are available in the market. A user 116 can also provide user-specified prefixes 120 to the backend analyzer. The user-specified prefixes can take priority over the network traffic statistics 112. The analyzer 110 can determine using the network traffic statistics 112, which prefixes are the most used. The prefixes most used directly correlates with the routes most used in the network in which the routers or switches 114 are located. The analyzer 110 generates a filter list of prefixes to use, which can include a maximum number of prefixes. A list size parameter 122 can be input into the analyzer 110 to provide the maximum number of prefixes in the filter list generated by the analyzer. The list size parameter 122 can change based upon a size of memory in the target routers 106. Using the inputs described above, the analyzer 110 generates a filter list of prefixes 130, which can be stored in a database (not shown) or transmitted directly to one or more frontend filters 140. The frontend filters 140 can be positioned geographically proximate to the target routers or switches 106, while the analyzer 110 can be geographically distant from the frontend route filter 140 and the target routers or switches 106.

The frontend 140 receives routing updates (e.g., BGP updates) 150 from peer routers or switches 152 (which can include any number of routers or switches). The updates can be associated with routing updates using any desired protocols. The routing updates 150 can be filtered by the frontend route filter 140 using the list of prefixes 130 such that only routing updates that include the prefixes are transmitted to the target routers or switches 106 in filtered routing updates 160. Furthermore, the route updates that are not covered by the prefixes are excluded from the filtered route updates. By not being covered, it is meant that the route update does not include the specific prefix or longer variants of the specific prefix. The filtered routing updates 160 are sized such as to ensure that the routing updates can fit within a Routing Information Base (RIB) and/or Forwarding Information Base (FIB) of the target routers or switches 106. One advantage of generating a filtered prefix list is that a memory of the target routers or switches 106 can be smaller, which translates into a cost savings for each network device. Having the frontend route filter 140 geographically proximate to the target router or switch 106 reduces any impact of network connectivity, which can occur between the backend analyzer 110 and the frontend 140.

Figure 2:
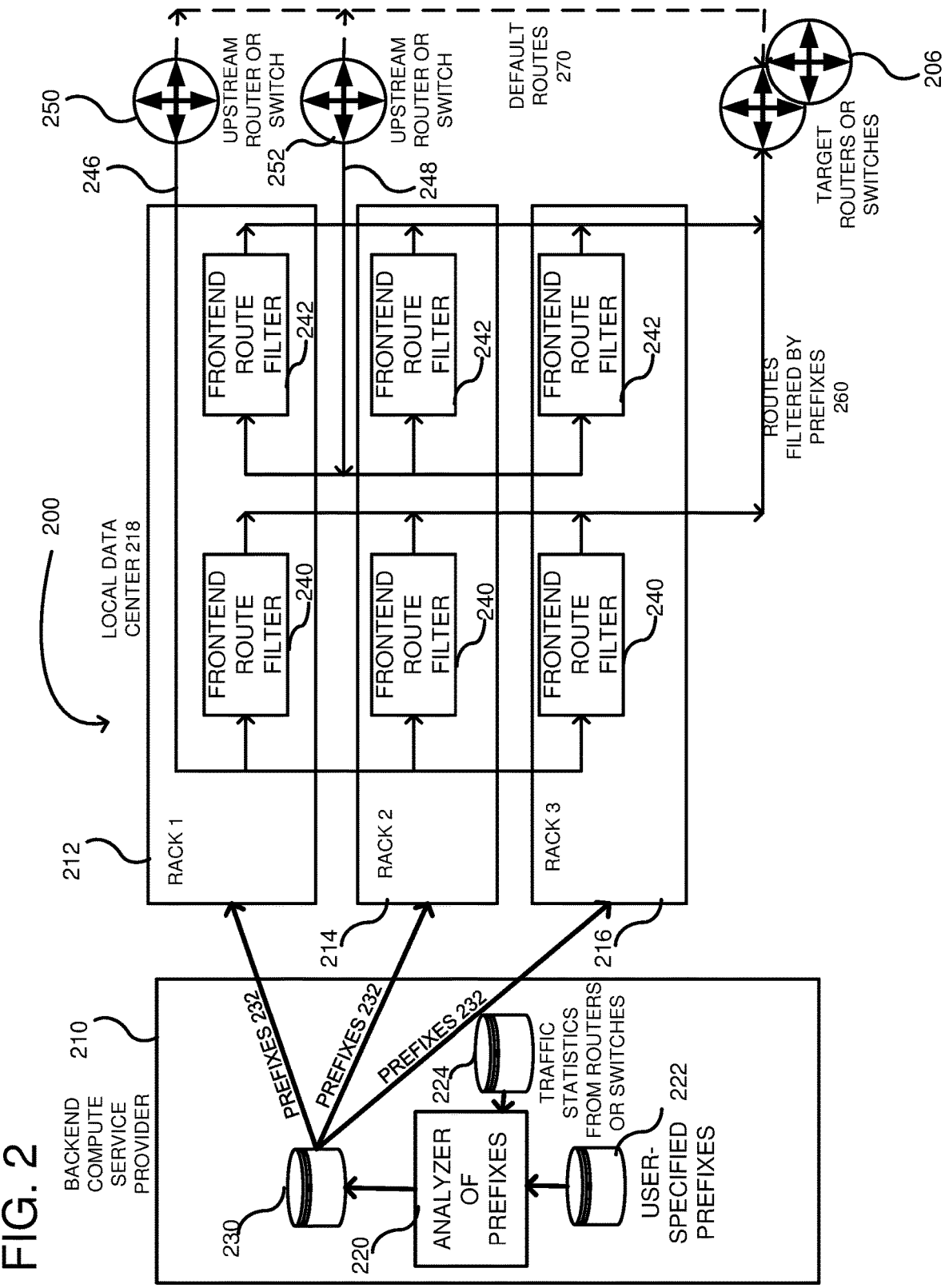
FIG. 2 is a detailed embodiment of a system for programming target routers or switches with a filtered route set.

FIG. 2 is a system 200 according to another embodiment for delivering updates to target routers or switches 206. The system 200 includes a backend compute service provider 210 and multiple racks 212, 214 and 216 of server computers in a local data center 218. The backend compute service provider 210 can be in a separate geographic area from the racks 212, 214, 216, such as different cities or states. The different racks 212, 214, 216 can be provided as replicas of each other for redundancy purposes. The compute service provider 210 can include an analyzer 220 of prefixes, which can execute on a server computer. A database 222 can include user-specified prefixes to be included within a list of prefixes generated by the analyzer 220. A second database 224 includes traffic statistics received from routers and/or switches within a network, similar to the traffic statistics described above in relation to FIG. 1. The analyzer 220 uses the traffic statistics to determine which prefixes are the most used and generates a subset of all prefixes used in the statistics. In one example, the number of prefixes chosen can be associated with a number of desired routes to be stored in the target routers or switches 206. The prefixes chosen can be further modified by the user-specified prefixes 222, which can receive priority over other prefixes. The analyzer 220 can then store the generated list of prefixes within a database 230. The list of prefixes can be pushed or pulled, as shown at 232, to the different racks 212, 214, 216. The racks 212, 214, 216 can include different groups 240, 242 of frontend filters. The different frontend route filters in group 240 can coordinate to prevent deviations in the forwarding tables. More specifically, the different frontend systems in group 240 can synchronize with each other (e.g., over a network) to ensure that a union of most used prefixes propagated always remains under a configured prefix count. A similar structure can be used for group 242. The frontend route filters 240, 242 can communicate with each other to ensure that they receive the same prefixes 232, although they can provide different routes to the target routers or switches 206. The frontend route filters 240, 242 can receive routing updates 246, 248 from upstream routers 250, 252, respectively. The frontend route filters 240 can then use the routing updates and the prefixes 232 to generate routes 260 to be applied to the target routers or switches 206. Likewise, the frontend route filters 242 can receive routing updates 248 and the prefixes 232 to generate the routes 260 to be applied to the target routers or switches 206. Notably, the prefixes, in this example, can be the same across the racks. A default route 270 can continue to be propagated from upstream peers 250, 252 to the target routers or switches 206 to avoid black-holing traffic in catastrophic failure scenarios.

Figure 3:
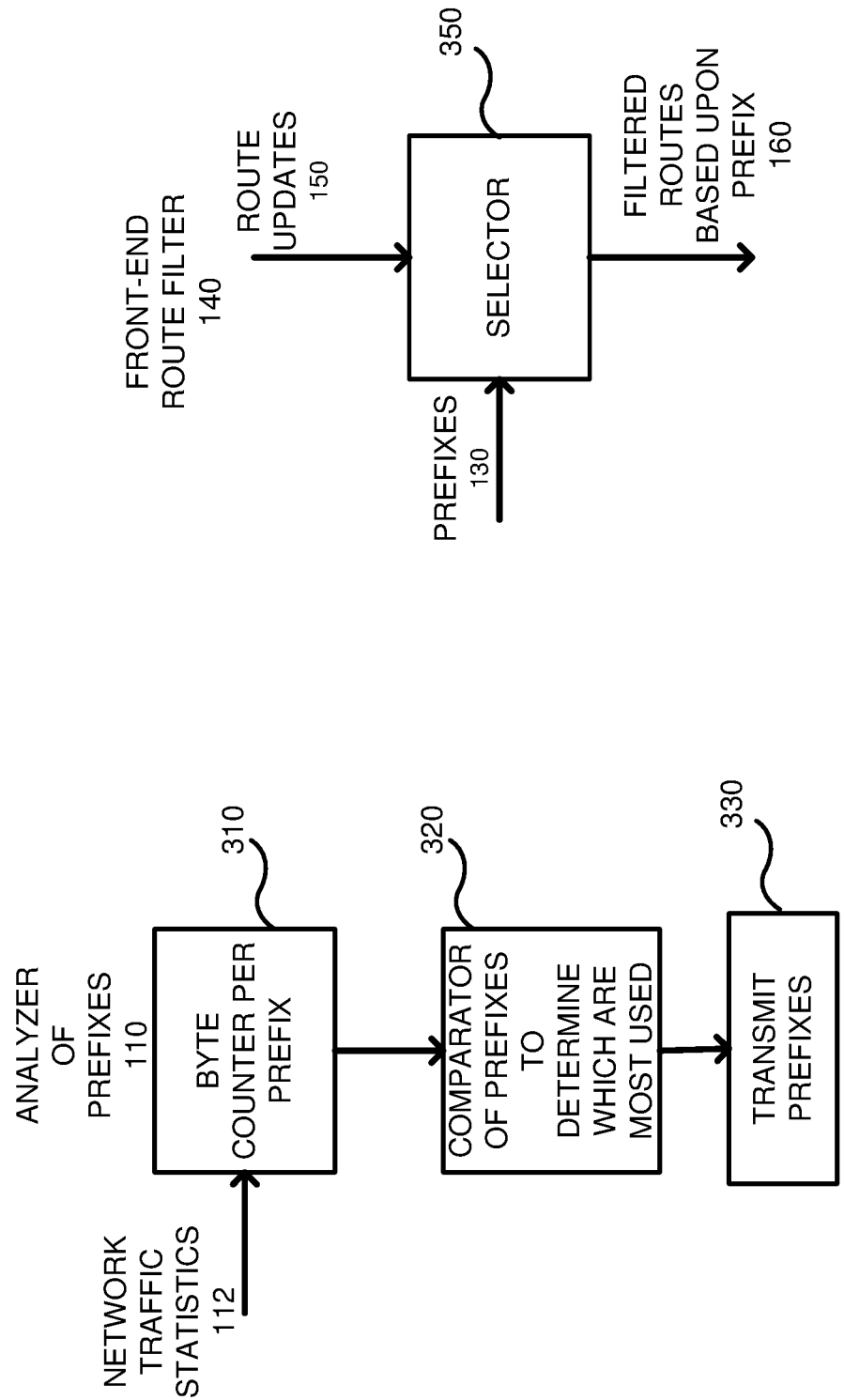
FIG. 3 shows an embodiment with additional details of an analyzer and front-end route filter used in FIGS. 1 and 2.

FIG. 3 shows details of the analyzer 110 and the frontend route filter 140 of FIG. 1. The analyzer and frontend route filter of FIG. 2 can be similar. The analyzer 110 includes a byte counter 310 per prefix to count a number of bytes for each prefix from the network traffic statistics 112. A comparator 320 can then be used to compare the counters 310 and determine which prefix is most used. The most used prefixes are selected and transmitted at 330 to a database or directly to the frontend filters. The frontend filter 140 receives the prefixes 130 and the route updates 150 and uses a selector 350 to select only the route updates having the prefixes 130 to generate the filtered routes 160.

Figure 4:
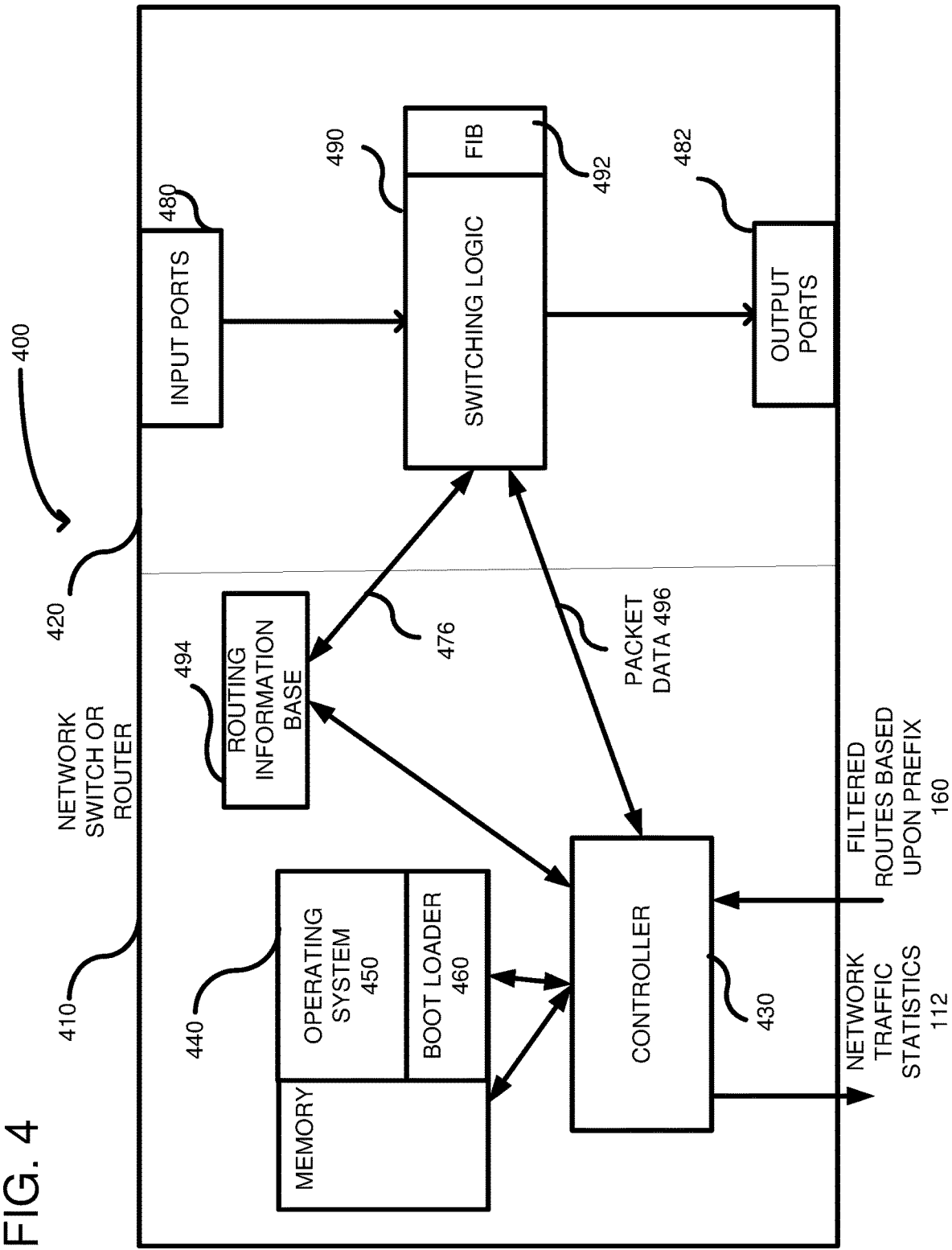
FIG. 4 shows an embodiment of a network router or switch including a forwarding table programmed with the filtered route set of FIGS. 1 and 2.

FIG. 4 is a first embodiment of a network device 400 (e.g., router or switch) that is used for forwarding packets to neighbor network devices. The network device 400 includes a control side 410 and a switching side 420. The control side 410 is generally a management layer for configuring, updating, and controlling the switching side 420. The control side includes a controller 430, which can be a Central Processing Unit (CPU), processor, application-specific integrated circuit (ASIC), microcontroller, or any hardware logic that can receive packets and provide switch management and control in response thereto. The controller 430 has access to a memory 440 that can be a Dynamic Random Access Memory (DRAM), Flash memory, or other type of RAM or ROM. The memory 440 is used to store an operating system 450 for the network device 400. The memory 440 may also include a boot loader program 460, which is a first program executed after a reboot of the controller 430, and which can run basic hardware tests before booting up the operating system 450. Although a single memory is shown, the memory 440 can be divided into multiple memories and even memories of different types. A communications bus 476 allows communications between a RIB 494 and the switching side 420. The communications bus 476 can be any desired bus type, such as PCI, PCIe, AGP, etc. The switching side 420 includes input port 480 and output port 482 used for receiving and sending network packets, respectively. Switching logic 490 is positioned intermediate the input and output ports. A FIB 492 is a forwarding table that can be programmed by the control side 410 and describes next hops for identified prefixes. Thus, routing information in terms of a next hop for a prefix is made by the switching logic 490 using the FIB.

The controller 430 can use one or more RIBs 494 to generate information needed to program the FIB 492. Different routing protocols such as BGP, IS-IS, OSPF, as well as static routes can be merged together to generate the RIB 494. Generally, the routes programmed in the RIB are received by the controller 430 from the frontend route filter 140 (FIG. 1), as shown at 160. The RIB 494 can then be programmed into the FIB 492. Once operational, the switching logic 490 can begin transmitting packets from the input port 480 to the output port 482. While transmitting packets, the controller 430 can collect information about the packets (i.e., packet data 496) being transmitted and pass such information to the analyzer 110 (FIG. 1), as indicated at 112. The network traffic statistics can include prefix data related to prefixes passing through the switching logic 490.

Although not shown, the switching logic 490 can include an Application Specific Integrated Circuit (ASIC). More specifically, the switching logic 490 can include multiple different hardware logic blocks including a Layer 2 hardware block, a Layer 3 hardware block, and an ACL hardware block. The layer 2 hardware block relates to an Ethernet layer and can forward packets based on MAC tables. The layer 3 hardware block relates to forwarding based on a prefix match of an IP address. The ACL block relates to permissions and can include rules whether to drop packets. The different hardware blocks can be coupled in series and additional hardware blocks can be added based on the design. Packets pass from the input port 480 to the output port 482 in accordance with the configuration of the layer 2 and 3 hardware logic blocks. Although only a single input and output port are shown, typically the ASIC controls multiple ports (e.g., 4 input ports and 4 output ports). Additionally, although not shown, interfaces are located in the input and output ports. Typically, each switch controls multiple interfaces used for forwarding traffic to next hops.

The network device 400 is described as a router or switch. However, the network device can include switches (multi-layer or single-layer), routers, repeaters, gateways, network bridges, hubs, protocol converters, bridge routers, proxy servers, firewalls, network address translators, multiplexers, network interface controllers, wireless network interface controllers, modems, ISDN terminal adapters, line drivers, and wireless access points, for example. A network device can also include any device used for forwarding packet data.

Figure 5:
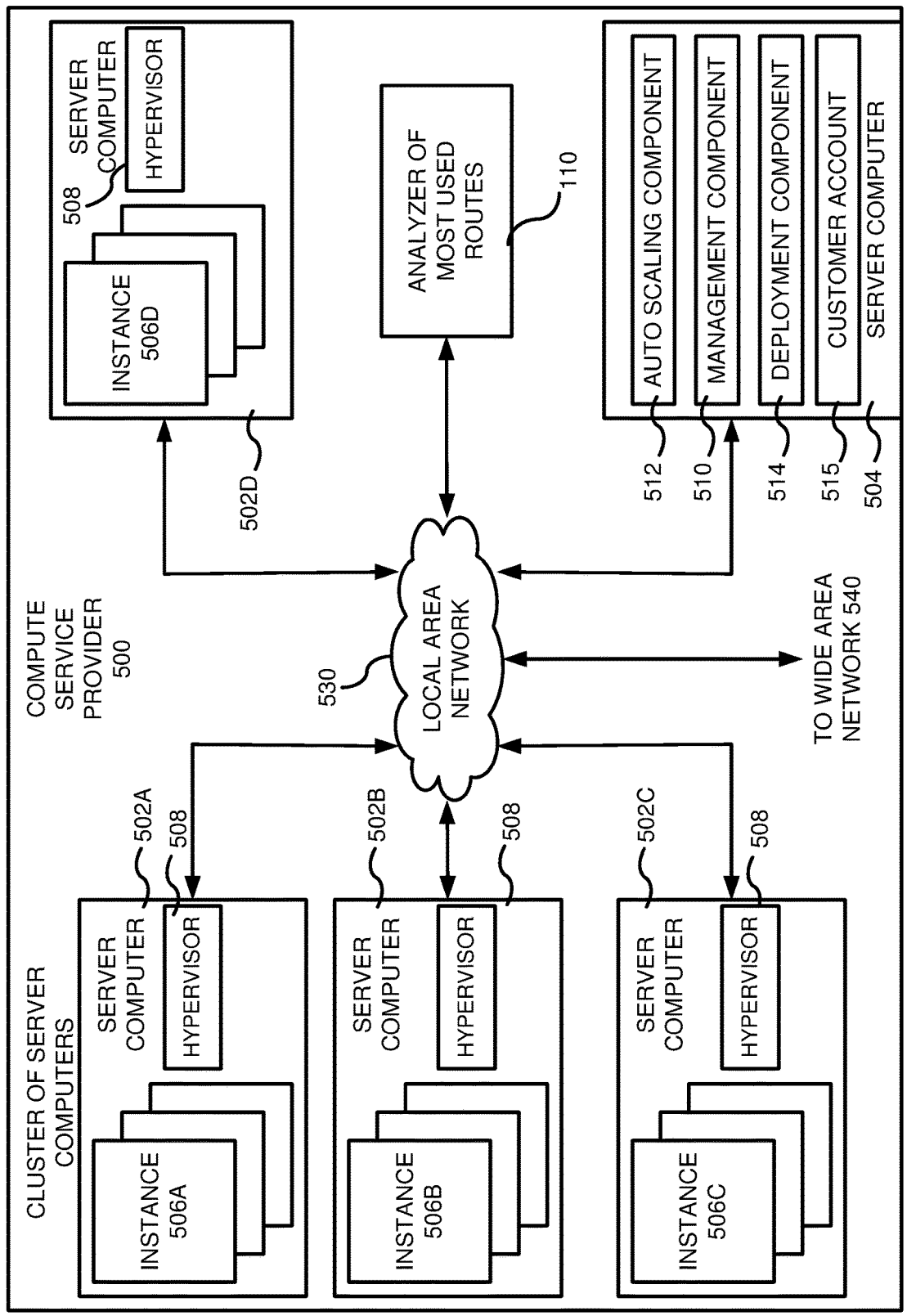
FIG. 5 is an example system diagram showing a plurality of virtual machine instances running in the multi-tenant environment, wherein the analyzer of FIG. 3 executes within the multi-tenant environment.

FIG. 5 is a computing system diagram of a network-based compute service provider 500 that illustrates one environment in which embodiments described herein can be used. The compute service provider 500 is an example of the compute service provider 210 of FIG. 2. By way of background, the compute service provider 500 (i.e., the cloud provider) is capable of delivery of computing and storage capacity as a service to a community of end recipients. In an example embodiment, the compute service provider can be established for an organization by or on behalf of the organization. That is, the compute service provider 500 may offer a "private cloud environment." In another embodiment, the compute service provider 500 supports a multi-tenant environment, wherein a plurality of customers operate independently (i.e., a public cloud environment). Generally speaking, the compute service provider 500 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 500 using networked client devices, such as desktop computers, laptops, tablets, smartphones, etc. running web browsers or other lightweight client applications. Those skilled in the art will recognize that the compute service provider 500 can be described as a "cloud" environment.

In some implementations of the disclosed technology, the computer service provider 500 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 500 includes a plurality of server computers 502A-502D. While only four server computers are shown, any number can be used, and large centers can include thousands of server computers. The server computers 502A-502D can provide computing resources for executing software instances 506A-506D. In one embodiment, the instances 506A-506D are virtual machines. As known in the art, a virtual machine is an instance of a software implementation of a machine (i.e. a computer) that executes applications like a physical machine. In the example of virtual machine, each of the servers 502A-502D can be configured to execute a hypervisor 508 or another type of program configured to enable the execution of multiple instances 506 on a single server. Additionally, each of the instances 506 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 504 can be reserved for executing software components for managing the operation of the server computers 502 and the instances 506. For example, the server computer 504 can execute a management component 510. A customer can access the management component 510 to configure various aspects of the operation of the instances 506 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 512 can scale the instances 506 based upon rules defined by the customer. In one embodiment, the auto scaling component 512 allows a customer to specify scale-up rules for use in determining when new instances should be instantiated and scale-down rules for use in determining when existing instances should be terminated. The auto scaling component 512 can consist of a number of subcomponents executing on different server computers 502 or other computing devices. The auto scaling component 512 can monitor available computing resources over an internal management network and modify resources available based on need.

A deployment component 514 can be used to assist customers in the deployment of new instances 506 of computing resources. The deployment component can have access to account information associated with the instances, such as who is the owner of the account, credit card information, country of the owner, etc. The deployment component 514 can receive a configuration from a customer that includes data describing how new instances 506 should be configured. For example, the configuration can specify one or more applications to be installed in new instances 506, provide scripts and/or other types of code to be executed for configuring new instances 506, provide cache logic specifying how an application cache should be prepared, and other types of information. The deployment component 514 can utilize the customer-provided configuration and cache logic to configure, prime, and launch new instances 506. The configuration, cache logic, and other information may be specified by a customer using the management component 510 or by providing this information directly to the deployment component 514. The instance manager can be considered part of the deployment component.

Customer account information 515 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Additionally, the customer account can include the user-specified prefixes 120 of FIG. 1.

A network 530 can be utilized to interconnect the server computers 502A-502D and the server computer 504. The network 530 can be a local area network (LAN) and can be connected to a Wide Area Network (WAN) 540 so that end users can access the compute service provider 500. It should be appreciated that the network topology illustrated in FIG. 5 has been simplified and that many more networks and networking devices can be utilized to interconnect the various computing systems disclosed herein.

The analyzer 110 can execute on a server computer in the computer service provider 500 and can execute on one of the instances 506. The analyzer 110 can compute the most used routes and generate a list of prefixes to be used by a frontend. Such a list can be transmitted over the local area network 530 and/or the wide area network 540.

Figure 6:
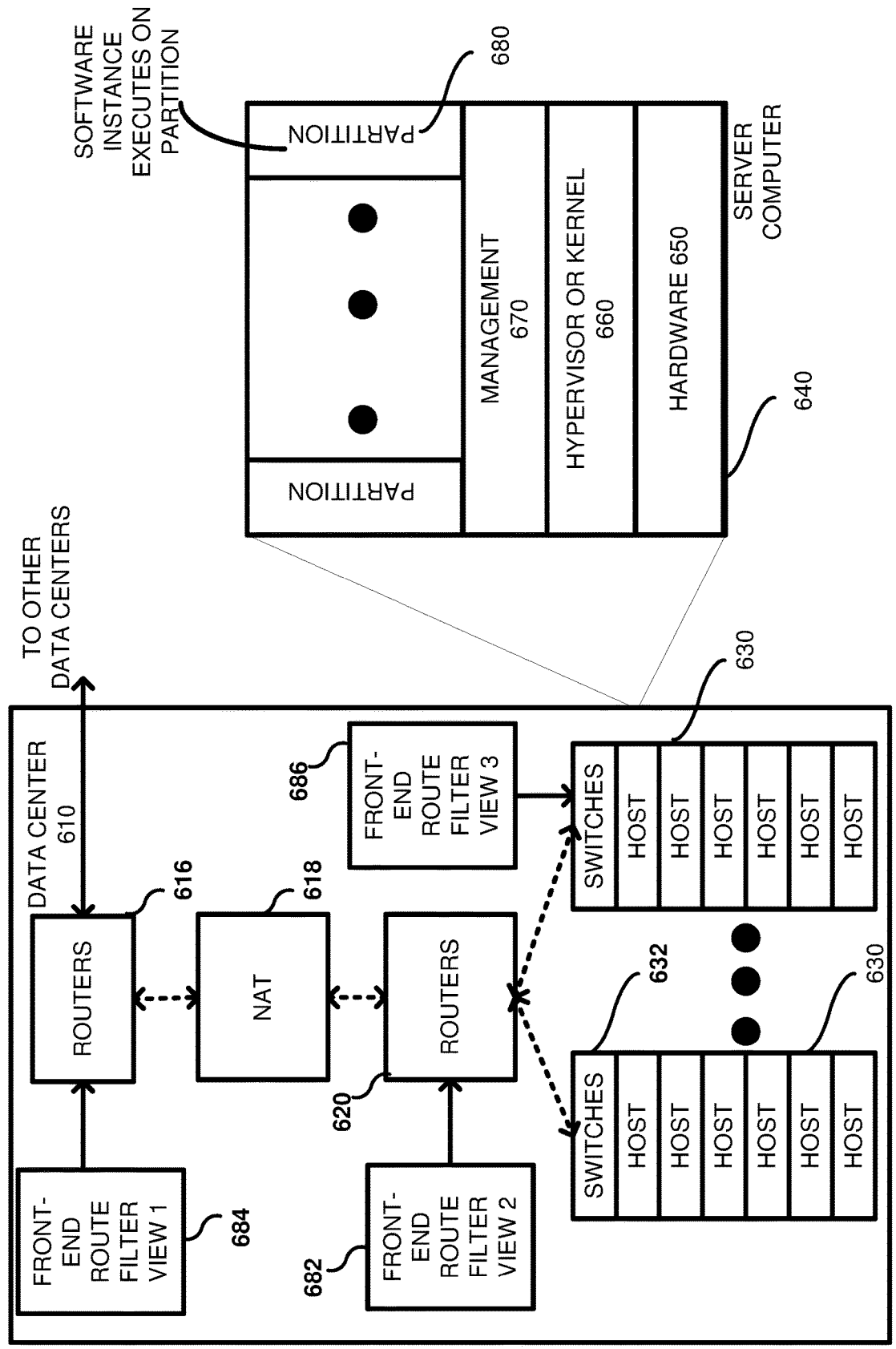
FIG. 6 shows an example of a plurality of host computers, routers and switches, which are hardware assets used for running virtual machine instances, wherein different frontend route filters are assigned to different categories of target routers or switches.

FIG. 6 illustrates a data center 610 in which multiple frontends can be positioned. The data center 610 can be coupled to other data centers by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address (dashed lines show potential packet flow). The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs, memory, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

The data center 610 can include multiple frontend route filters 682, 684, 686 and each frontend route filter can have a different view. By having a different view, it is meant that a category of network device can be different (e.g., a switch vs a router), the size of memory can be different, the function in the network is different (top-of-rack switch versus edge router), or the prefix list can be different. For example, frontend route filter 684 has a view 1 used for edge routers 616. By contrast, frontend route filter 682 is used for routers coupled to the racks of server computers. Still further, the frontend route filter 686 is coupled to the top-of-rack switches 632. Thus, each view can be associated with different device types or different positions within the datacenter. Each view can also be associated with a different memory size. Still further, the different views can be associated with different services. Thus, each frontend 682, 684, 686 can receive different filtered lists of prefixes from the analyzer (e.g., analyzer 110, FIG. 1). Although not shown, the frontend route filters 682, 684, 686 can communicate with each other, but can also operate independently.

Figure 7:
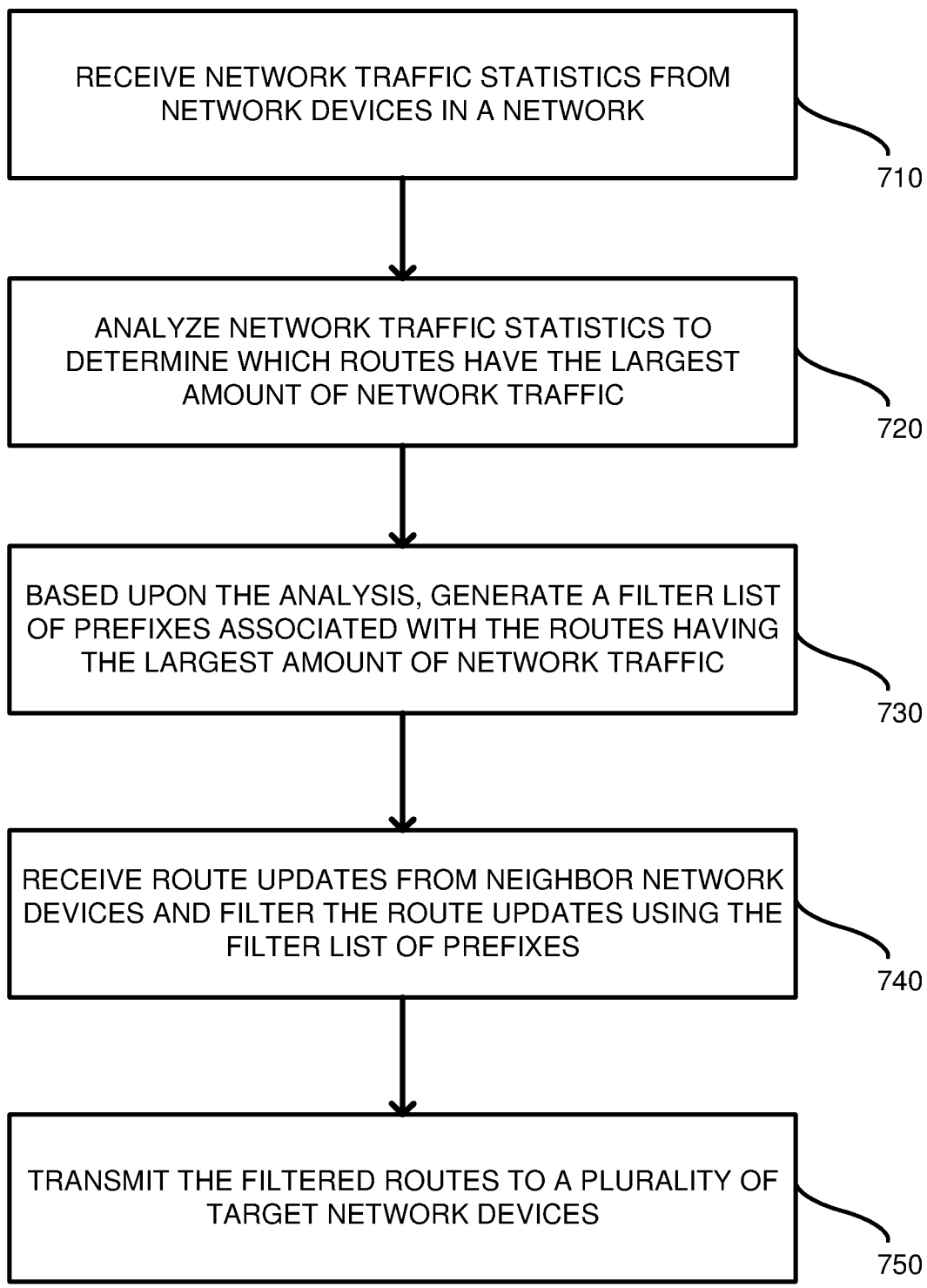
FIG. 7 is a flowchart according to one embodiment for programming target routers or switches with a filtered route set.

FIG. 7 is a flowchart according to one embodiment for generating filtered routes to program target devices. In process block 710, network traffic statistics are received from network devices in a network. For example, in FIG. 1, the network traffic statistics 112 are delivered from routers or switches 114. In FIG. 4, the controller 430 can execute an agent (not shown) that collects the network traffic statistics from the switching logic 490. The network traffic statistics can include source and destination addresses used for identifying prefixes that are the most used prefixes in the network traffic. In process block 720, the network traffic statistics are analyzed to determine which routes have the largest amount of network traffic. For example, in FIG. 1, the analyzer 110 can receive the network traffic statistics 112 and can determine which prefixes are the most used. As shown in FIG. 3, such analysis can include counting the prefixes used using counters 310 and then comparing the counters to determine the most used prefixes. In process block 730, based upon the analysis, a filter list of prefixes is generated, wherein the prefixes are associated with the routes having the largest amount (most used) of traffic. Returning to FIG. 3, the output of the comparators 320 is the generation of the prefix list for transmission (330). The prefix list represents a certain percentage (e.g., 30%) of all of the prefixes or a fixed number of prefixes. In any case, the prefixes are a reduced set of all of the prefixes used. Generally, the prefix list represents the prefixes most used in the network traffic. In process block 740, route updates are received from neighbor network devices and the route updates are filtered using the filter list of prefixes. For example, in FIG. 1, the frontend route filter 140 can receive the routing updates 150 and the filter list of prefixes 130. Using these inputs, the frontend route filter 140 can filter the route updates to generate filtered route updates 160. The filtered route updates can be updates that only include the prefixes from the filtered list of prefixes. Other updates that do not include the prefixes are discarded. In process block 750, the filtered routes are transmitted to a plurality of target network devices. For example, in FIG. 1, the target routers or switches 106 can receive the filtered routs 160 and can program their FIBs accordingly.

Figure 8:
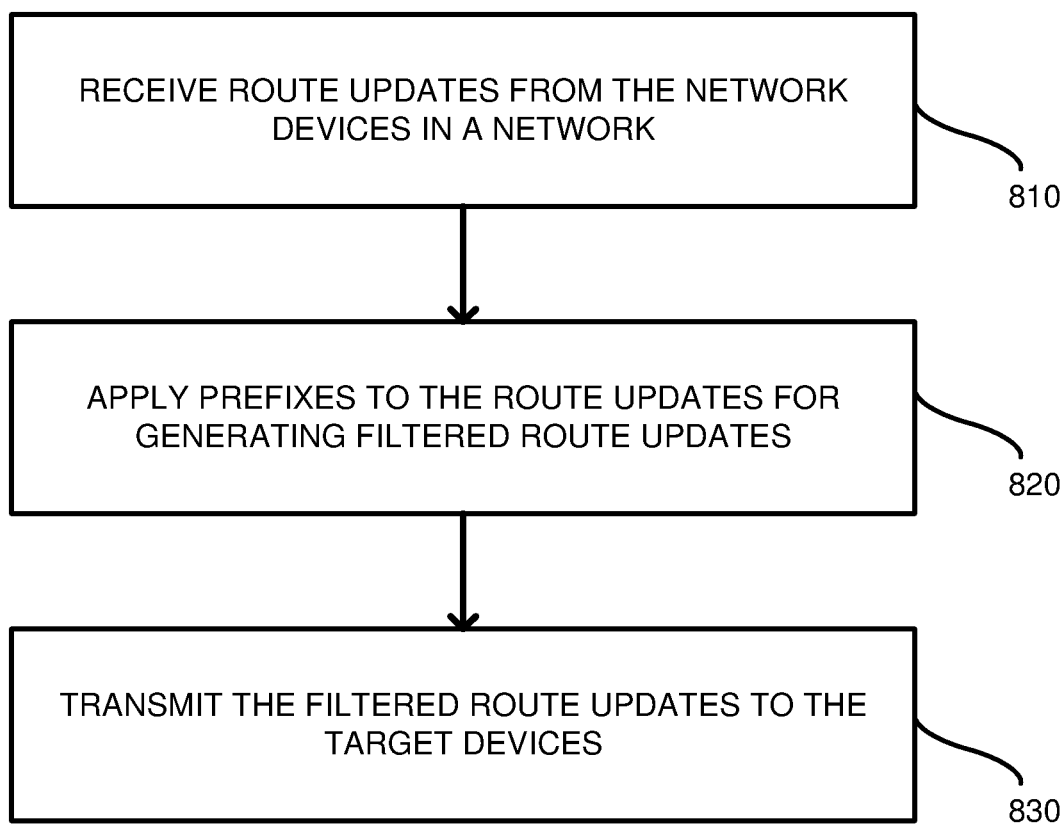
FIG. 8 is a flowchart according to one embodiment for programming target routers or switches with a filtered route set.

FIG. 8 is a flowchart according to another embodiment for updating target routers. In process block 810, route updates are received from the network devices in a network. For example, in FIG. 2, the frontend route filter 240 can receive updates from the upstream router or switch 250. In process block 820, prefixes are applied to the route updates to generate filtered route updates. For example, in FIG. 2, the prefixes 232 received from the database 230 are used to generate filtered route updates. When the prefixes are applied, it can be the specific prefixes or a longer version of the specific prefixes (e.g., for the specific prefix of a /23, the longer version can be a /24). In process block 830, the filtered route updates are transmitted to the target devices. For example, in FIG. 2, the filtered route updates 260 are transmitted to the target routers or switches 206. In FIG. 4, once the filtered routes 160 are received in the controller 430, the routes can be programmed into the RIB 494, and then programmed into the FIB 492. Once programmed, the FIB can be used to switch network packets.

Figure 9:
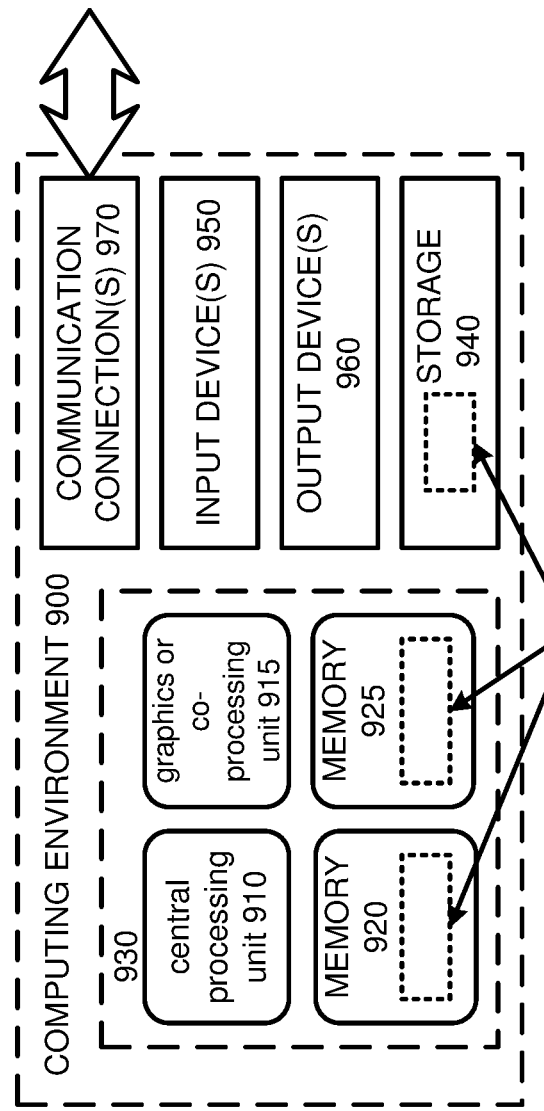
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s). For example, the software 980 can be used for the frontend route filter (e.g., FIG. 1, 140) or analyzer (e.g., FIG. 1, 110)

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of programming a network device, the method comprising:
   receiving network traffic statistics from network devices within a network;
   analyzing the network traffic statistics to determine which routes have the largest amount of network traffic;

based upon the analysis, generating a filter list of prefixes associated with the routes that have the largest amount of network traffic;

receiving route updates from neighbor network devices and filtering the route updates using the filter list of prefixes to generate filtered route updates; and transmitting the filtered route updates to a plurality of target network devices for programming the target network devices, where the generating of the filter list of prefixes is performed by an analyzer located in a different geographic region from a route filter, which performs the transmitting of the filtered route updates.

2. The method of claim 1, wherein the filter list of prefixes is a first filter list associated with a first group of the target network devices, and the method further includes generating a second filter list associated with a second group of the target network devices, wherein the first filter list contains a different list of prefixes than the second filter list.

3. The method of claim 1, further including programming a forwarding table in a network device using the filtered route updates.

4. The method of claim 1, wherein the network devices are routers or switches.

5. A method, comprising:

receiving route updates from network devices in a network;

applying prefixes to the route updates for generating filtered route updates, wherein the filtered route updates include the prefixes;

transmitting the filtered route updates to target network devices to program the target network devices; and generating the prefixes based upon which prefixes are most used in recent network traffic and wherein the generating of the prefixes occurs in a server computer located in a different geographic region than a server computer that applies the prefixes to the route updates.

6. The method of claim 5, wherein the target network devices are routers or switches and the applying of the prefixes to the route updates is performed in a server computer, which distributes the filtered route updates to the target network devices.

7. The method of claim 5, wherein the route updates that are not covered by the prefix list are excluded from the filtered route updates.

8. The method of claim 5, wherein the filtered route updates are a first set of filtered route updates, and the method further includes generating a second set of filtered route updates, different than the first set of filtered updates and transmitting the first set of filtered route updates to a different category of network device than the second set of filtered route updates.

9. The method of claim 5, wherein the generating of the prefixes includes receiving user-specified prefixes that are included with the most used prefixes.

10. The method of claim 5, wherein the prefixes are specific prefixes or longer versions of the prefixes.

11. The method of claim 5, wherein the filtered route updates are a subset of the received route updates.

12. The method of claim 5, wherein the filtered route updates are received by the target network devices, which then program a forwarding table in each target network device using the filtered route updates.

13. The method of claim 5, wherein the route updates are Border Gateway Protocol (BGP) advertisements.

14. A system, comprising:

a first server computer for receiving traffic statistics from network devices and for computing a list of prefixes representative of routes most used in a network;

a second server computer coupled to the first server computer, the second server computer for receiving route updates from neighbor network devices and for filtering the route updates based upon the list of prefixes; and a network device to be updated, wherein the network device to be updated is coupled to the second server computer for receiving the filtered route updates from the second server computer.

15. The system of claim 14, wherein the network device to be updated includes memory for a forwarding table and wherein the filtered route updates are used to program the forwarding table.

16. The system of claim 14, wherein the first server computer is in a different geographic region than the second server computer.

17. The system of claim 14, wherein the first server computer computes different lists of prefixes for different target network devices.

* * * * *